(12) United States Patent
Karl et al.

(10) Patent No.: US 6,745,931 B2
(45) Date of Patent: Jun. 8, 2004

(54) METHOD FOR THE PRODUCTION OF A SEALING ELEMENT

(75) Inventors: Schreiber Karl, Mellensee (DE); Goebel Matthias, Berlin (DE); Stefan Reuter, Berlin (DE)

(73) Assignee: Rolls-Royce Deutschland Ltd. & Co KG, Dahlewitz (DE)

( * ) Notice: Subject to any disclaimer, the term of this patent is extended or adjusted under 35 U.S.C. 154(b) by 0 days.

(21) Appl. No.: 10/198,149

(22) Filed: Jul. 19, 2002

(65) Prior Publication Data

US 2003/0019914 A1 Jan. 30, 2003

(30) Foreign Application Priority Data

Jul. 24, 2001 (DE) .......................................... 101 35 974

(51) Int. Cl.⁷ .............................................. B23K 31/02
(52) U.S. Cl. ....................................... 228/181; 228/183
(58) Field of Search ................................ 228/181, 183, 228/245, 248.1, 256, 261

(56) References Cited

U.S. PATENT DOCUMENTS

| | | | | |
|---|---|---|---|---|
| 3,660,891 A | * | 5/1972 | Martin | 228/181 |
| 3,844,011 A | * | 10/1974 | Davies | 428/547 |
| 4,618,152 A | | 10/1986 | Campbell | |
| 4,671,841 A | * | 6/1987 | Stephens | 156/292 |
| 4,725,509 A | * | 2/1988 | Ryan | 428/607 |
| 4,869,421 A | | 9/1989 | Norris et al. | |
| 5,192,623 A | * | 3/1993 | Gewelber | 428/593 |
| 5,594,930 A | * | 1/1997 | Terada et al. | 419/5 |
| 6,485,025 B1 | * | 11/2002 | Hammersley et al. | 277/414 |

2003/0019914 A1 * 1/2003 Karl et al.

FOREIGN PATENT DOCUMENTS

| | | | |
|---|---|---|---|
| DE | 1043733 | | 11/1958 |
| DE | 3122904 | | 1/1983 |
| DE | 3335570 | | 7/1984 |
| FR | 2258524 | | 8/1975 |
| GB | 2353750 A | * | 3/2001 |
| JP | 59179265 | | 10/1984 |
| JP | 61061845 A | * | 3/1986 |
| JP | 02251364 | | 10/1990 |
| JP | 404333362 A | * | 11/1992 |
| JP | 406170519 A | * | 6/1994 |
| JP | 408215580 A | * | 8/1996 |
| JP | 409156000 A | * | 6/1997 |

OTHER PUBLICATIONS

German Search Report dated Nov. 13, 2003.

* cited by examiner

Primary Examiner—Kiley Stoner
(74) Attorney, Agent, or Firm—Davidson Berquist Klima & Jackson, LLP

(57) ABSTRACT

A method for the production of a sealing element with a backing 1 and a honeycomb structure 2 attached to this backing 1, in which the cellular arrangement of the honeycomb structure 2 is formed by individual, profiled layers 3 to 7 made of a thin, foil-like, metallic material, and in which the layers 3 to 7 are bonded to each other and the honeycomb structure 2 is bonded to the backing 1, wherein the bonding of the individual layers 3 to 7 of the honeycomb structure 2 and the bonding of the honeycomb structure 2 to the backing 1 is effected by means of a brazing process in which pure aluminum or an aluminum alloy is used as the brazing filler material.

31 Claims, 2 Drawing Sheets

METHOD FOR THE PRODUCTION OF A SEALING ELEMENT

This application claims priority to German Patent Application No. 101 35 974.8, filed Jul. 24, 2001, which application is incorporated by reference herein.

BACKGROUND OF THE INVENTION

This invention relates to a method for the production of a sealing element with a backing and a honeycomb structure attached to this backing in which the cellular arrangement of the honeycomb structure is formed by individual, profiled layers made of a thin, foil-like, metallic material, and in which the layers are bonded to each other and the honeycomb structure is bonded to the backing Sealing elements of the type described are known in the state-of-the-art, for example on gas turbines or on thermal turbomachinery. The sealing elements are used in these applications as so-called abradable seal segments. The honeycomb structure is usually bonded to the backing by means of a special brazing and/or diffusion process. The backing itself is a casting or a sheet-metal plate, for example in the form of a ring or a ring segment.

The initially cited abradable seals serve to improve the performance and/or efficiency of the thermal turbomachine or the gas turbine by sealing the gap between a stationary and a rotary component, for example on blades or shafts, or by keeping such a gap as small as possible. Such honeycomb-type sealing structures are used, in particular, in the hot turbine section. They consist of thin metal-foil ribbons which are arranged to form honeycomb structures. The metal foils are cut-to-width and formed to create flat plateaus, these plateaus being parallel with each other and protruding down- or upwards. The known honeycomb structure is obtained by arranging various such metal-foil ribbons one on the other or one behind the other, respectively.

The honeycomb structure or cellular structure thus formed is used as abradable seal. Its configuration ensures that it exerts only minor resistance to the fast rotating components rubbing against it, thus preventing the rotating components, such as blades, from damage.

In the sealing elements known in the state-of-the-art, bonding of the individual layers to each other and bonding of the honeycomb structure to the backing is achieved by means of a brazing process. For this process, conventional brazing filler materials, such as alloys with a high nickel or cobalt content, are used. Since these nickel or cobalt alloys have high melting points, alloy elements which lower the melting point, such as boron, are added, thereby providing a suitable brazing filler material. Another variant is the provision of brazing filler materials in the form of eutectic alloy with an intrinsically low melting point. Here, the eutectic or near-eutectic compositions known in the nickel-silicon system are to be named. The brazing filler materials according to the state-of-the-art have a solidus temperature in the range of 800 to 1300° C.

The elements lowering the melting point, such as boron or silicon, are detrimental in many respects. While the brazing filler material is in the molten state, these elements diffuse into the material of the honeycomb structure and of the backing forming intermetallic compounds, such as borides and silicides, for example of the type $Cr_xB_y$, with the alloy elements of these materials. Normally, these intermetallic compounds are found at the grain boundaries of the base metals or at the grain boundaries of the re-solidified brazing filler material. They cause embrittlement of the base metals and of the brazing filler material and, hence, of the entire assembly of the sealing element.

A further disadvantage lies in the fact, that several of the intermetallic compounds formed, such as chrome-borides ($Cr_xB_y$), are susceptible to corrosion.

Since the sealing elements according to the present invention are exposed to high operating temperatures by hot process media, they must be resistant to hot-gas attack and, hence, to high-temperature oxidation, high-temperature sulfidation and/or high-temperature carbonization. In the sealing elements according to the state-of-the-art, this is achieved by using high chrome-alloyed nickel-base alloys for the material of the honeycomb structure.

SUMMARY OF THE INVENTION

In a broad aspect, the present invention provides a method for producing a sealing element of the type specified at the beginning which combines simplicity of design and development with cost-effective, safe operation while avoiding the disadvantages of the state-of-the-art.

It is a particular object of the present invention to provide remedy to the above problems by the combination of the features cited in the independent claims, with further advantages becoming apparent from the sub-claims.

Accordingly, the present invention provides for bonding of the individual layers of the honeycomb structure and for bonding of the honeycomb structure to the backing by means of a brazing process in which pure aluminum or an aluminum alloy is used.

BRIEF DESCRIPTION OF THE DRAWINGS

The present invention is more fully described in light of the accompanying drawings showing a preferred embodiment. On the drawings.

DETAILED DESCRIPTION OF THE INVENTION

Figure 1:
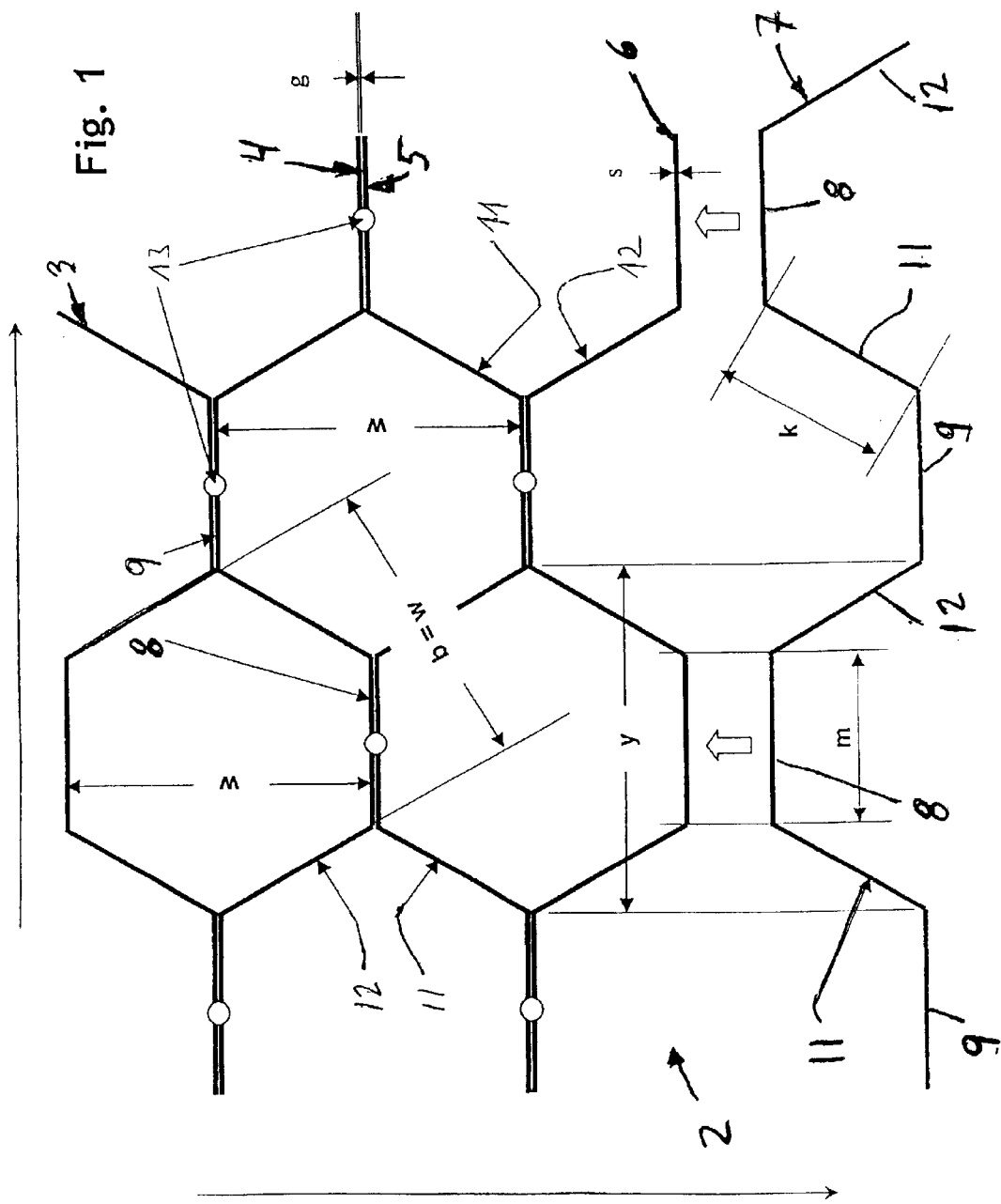
FIG. 1 is a schematic view of the design of the honeycomb structure in accordance with the present invention.

The method according to the present invention is characterized by a variety of merits.

The special method according to the present invention, in which essentially aluminum or an aluminum alloy is used as brazing filler material, will also reinforce the material of the honeycomb structure in itself, with both the material of the backing and of the honeycomb structure being enriched with aluminum. Hence, the sealing element as provided by the present invention is highly advantageous in particular with regard to its thermal resistance and its resistance to hot-gas attack.

According to the present invention, the disadvantages of the state-of-the-art are avoided in that pure aluminum or aluminum alloy is used as brazing filler material. The brazing process at a relatively low temperature completely melts the aluminum or the aluminum alloy, respectively. Brazing is here effected above the melting temperature of the aluminum or above the liquidus temperature of the aluminum alloy, respectively. In the process, the molten aluminum will partly dissolve the material of the honeycomb structure and the base metal of the backing, which results in an increase of the melting point of the aluminum alloy thus formed and in isothermal solidification of the aluminum, and, in consequence, in the formation of a bond between the cellular structure and the backing structure. Additionally, a reinforcement of the walls of the honeycomb structure is achieved.

In a further favorable development, the present invention provides for subsequent heat treatment. Such heat treatment can be performed at brazing temperature (constant temperature) or at a temperature which is higher than the brazing temperature. This provides for a concentration compensation by way of diffusion, in which primarily the interior of the foil-like material of the honeycomb structure is enriched with aluminum from the skin of the material of the backing. As a result, the resistance to oxidation and hot-gas corrosion is significantly improved.

The aluminum or aluminum alloy used as brazing filler material in accordance with the present invention can be applied in the most different ways.

For example, the honeycomb structure can initially be produced such that the individual folded or formed layers are attached to each other by resistance spot welding. Here, the layers, or folded ribbons, are positioned perpendicular to the surface of the backing. Aluminum or aluminum-alloy powder can now be filled into the cells thus produced which are closed on the bottom side. This set-up is then heated in a vacuum brazing oven, for example, to approximately 660 to 1100° C. In the process, the aluminum or the aluminum alloy melts, solidifies subsequently and gives rise to the diffusion processes described above.

The pure aluminum powder or the aluminum-alloy powder may also be applied to the cellular honeycomb structure by thermal spraying, for example. Also, the honeycomb structure which is resistance-welded to the backing structure can be enriched superficially with aluminum by bath aluminizing or pack aluminizing. Other suitable processes are physical vapor deposition (PVD) or chemical vapor deposition (CVD).

In a particularly favorable development of the present invention, the aluminum brazing filler material or the aluminum alloy used as brazing filler material is applied in advance to the surfaces of the layers of the honeycomb structure. This variant is advantageous in that the wetting with aluminum and aluminum alloy as well as the enrichment with aluminum during the process is not confined to the double-layer walls, but can include the other, single-layer walls of the honeycomb structure. The aluminum brazing filler material can, for example, be applied by immersion aluminization or by bath aluminization. Also, PVD or CVD processes may be applied to the finished ribbon. Furthermore, the ribbon can be roll clad with aluminum or a suitable aluminum alloy prior to finish rolling.

In an advantageous development, the present invention provides for the use of an aluminum foil. This foil is formed similar to the layers of the base metal, for example during manufacture of the honeycomb structure, and is directly incorporated into the honeycomb structure, thereby providing for optimum pre-positioning of the aluminum in the cellular structure.

With regard to the temperatures required, the present invention provides for adjustability to the alloys and the respective provisions of design. It is also possible to select a temperature range between 550 and 1150° C.

A comparison between the state-of-the-art and the present invention reveals that the addition of aluminum contributes positively to the resistance to hot-gas corrosion. This is explicable from the fact that the aluminum content causes dense, tightly adherent aluminum-oxide layers ($Al_2O_3$) to form under oxidizing hot-gas conditions. This superficial aluminum-oxide layer very effectively protects the material against continued hot-gas attack at high operating temperatures.

The alloy element chrome may functionally be substituted for aluminum if the latter is not present in the matrix, however, with clearly inferior protective effects at high temperatures. This leads to the disadvantages known in the state-of-the-art. For processibility reasons, the conventional ribbon materials used for the manufacture of the honeycomb structure are alloyed only lightly or not at all with aluminum in the state-of-the-art. Similarly, the brazing filler materials known in the state-of-the-art are mostly absolutely devoid of aluminum. This circumstance and the presence of intermetallic compounds in the brazing filler material cause an often low resistance to hot-gas corrosion. Therefore, the design according to the state-of-the-art generally has only low resistance to oxidation and hot-gas corrosion. In particular, the free and braze-wetted surfaces of the sealing element constitute weak points in the state-of-the-art in terms of hot-gas-corrosion resistance in gas turbine applications.

As indicated above, the present invention relates to a honeycomb structure in which the base material is not aluminum. Base materials or base alloys are, in particular, iron-base alloys, nickel-base alloys, cobalt-base alloys or titanium-base alloys, or their combinations.

This applies similarly to the selection of the material of the backing.

Furthermore, the present invention relates to a brazing process without flux as well as to a brazing process with flux. Suitable fluxes can, for example, be fluorides, in particular potassium aluminum fluorides.

FIG. 1 shows schematically the design of a honeycomb structure 2 in accordance with the present invention. It consists of individual layers 3, 4, 5, 6, 7 of profiled, thin, foil-like metallic plates. The individual plates are folded and shaped to form individual plateaus 8, 9, these plateaus being parallel with each other and protruding up- or downwards. The individual plateaus are connected with each other by the tracts 11, 12. By arranging one layer on the other, a honeycomb-style structure is created and comprises areas with single-wall thickness formed by the tracts 11, 12 and areas with double-wall thickness formed by the plateaus 8, 9. The plateaus 8, 9 are attached to each other by spot welds 13. The honeycomb structure so produced has a dimension across flats of w, a cell width of b, a layer thickness in the single-layer areas of s and a layer thickness in the double-layer areas of g. In FIG. 1, the base of the plateaus is indicated with m and the length of the tracts with k. The diagonal length of the respective cell is indicated with y.

Figure 2:
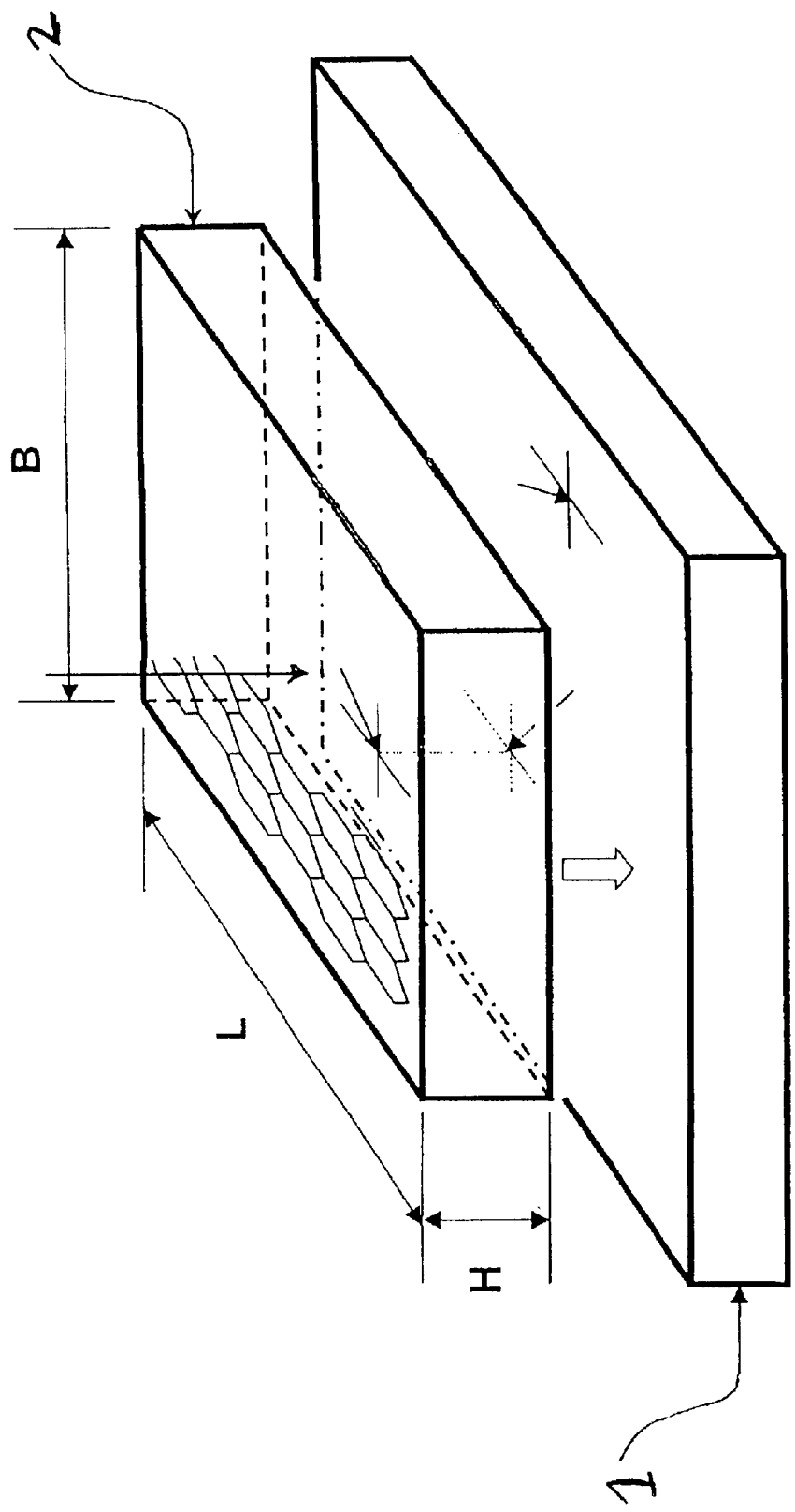
FIG. 2 is a perspective, highly simplified view of the design of the sealing element in accordance with the present invention.

FIG. 2 shows a simplified, perspective view of backing 1 which can be a casting or a metal-plate stamping. It can be flat or annular or in the form of ring segments. The cell structure of the honeycomb arrangement is applied to the surface of the backing structure, or backing in such a manner that the original ribbons (layers) are perpendicular, i.e. at an angle of 90° to the surface of the backing, as indicated in FIG. 2. In this figure, H indicates the width of the ribbons, which corresponds to the thickness of the honeycomb structure 2 formed by the cells. Reference numeral L indicates the direction parallel to the double-layer walls and also the direction of the relative movement of the rubbing, rotating components. Reference numeral B indicates the width of the abradable area of the sealing element according to the present invention.

A foil in a high-temperature resistant material, such as Hayes 214 or PM 2000 can be used as material for the ribbons of the honeycomb structure. The backing can be made of a nickel-base precision-casting material, such as C1023.

A plurality of modifications may be made to the embodiments here shown without detracting from the inventive concept.

What is claimed is:

1. A method for the production of a sealing element with a backing and a honeycomb structure attached to this backing, in which the cellular arrangement of the honeycomb structure is formed by individual, profiled layers made of a thin, foil-like, metallic material, and in which the layers are bonded to each other and the honeycomb structure is bonded to the backing, wherein the bonding of the individual layers of the honeycomb structure and the bonding of the honeycomb structure to the backing are performed by a brazing process in which pure aluminum is used as brazing filler material.

2. A method in accordance with claim 1, wherein the brazing is performed at a brazing temperature above the melting temperature of the aluminum.

3. A method for the production of a sealing element with a backing and a honeycomb structure attached to this backing, in which the cellular arrangement of the honeycomb structure is formed by individual, profiled layers made of a thin, foil-like, metallic material, and in which the layers are bonded to each other and the honeycomb structure is bonded to the backing, wherein the bonding of the individual layers of the honeycomb structure and the bonding of the honeycomb structure with the backing are performed by a brazing process in which an aluminum alloy is used as brazing filler material, and wherein a subsequent heat treatment is performed at a temperature at least that of a temperature of the brazing.

4. A method in accordance with claim 3, wherein the brazing is performed at a brazing temperature above the liquidus temperature of the aluminum alloy.

5. A method in accordance with claim 1, wherein a subsequent heat treatment is performed at a brazing temperature.

6. A method in accordance with claim 1, wherein a subsequent heat treatment is performed at a temperature above the brazing temperature.

7. A method in accordance with claim 1, wherein the brazing filler material is applied in powder form.

8. A method in accordance with claim 1, wherein the brazing filler material is applied by thermal spraying.

9. A method in accordance with claim 1, wherein the brazing filler material is applied by bath aluminizing.

10. A method in accordance with claim 1, wherein the brazing filler material is applied by pack aluminizing.

11. A method in accordance with claim 1, wherein the brazing filler material is applied by physical vapor deposition (PVD).

12. A method in accordance with claim 1, wherein the brazing filler material is applied by chemical vapor deposition (CVD).

13. A method in accordance with claim 1, wherein the brazing filler material is applied to at least one surface of the material used for the honeycomb structure prior to processing.

14. A method in accordance with claim 1, wherein the brazing filler material is applied to at least one surface of the material used for the honeycomb structure in the form of an additional foil.

15. A method in accordance with claim 1, wherein the surface of the items to be joined is wetted with a surface-cleaning, low-melting flux prior to brazing.

16. A method in accordance with claim 15, wherein fluorides are used as the flux.

17. A method in accordance with claim 16, wherein potassium aluminum fluorides are used as the flux.

18. A method in accordance with claim 1, wherein the honeycomb structure, which is formed by the individual profiled layers, is made of material alloys of which the basis is one of iron, nickel, cobalt, titanium and combinations thereof.

19. A method in accordance with claim 3, wherein the subsequent heat treatment is performed at a temperature above the brazing temperature.

20. A method in accordance with claim 3, wherein the brazing filler material is applied in powder form.

21. A method in accordance with claim 3, wherein the brazing filler material is applied by thermal spraying.

22. A method for the production of a sealing element with a backing and a honeycomb structure attached to this backing, in which the cellular arrangement of the honeycomb structure is formed by individual, profiled layers made of a thin, foil-like, metallic material, and in which the layers are bonded to each other and the honeycomb structure is bonded to the backing, wherein the bonding of the individual layers of the honeycomb structure and the bonding of the honeycomb structure with the backing are performed by a brazing process in which an aluminum alloy is used as brazing filler material, wherein the brazing filler material is applied by bath aluminizing.

23. A method for the production of a sealing element with a backing and a honeycomb structure attached to this backing, in which the cellular arrangement of the honeycomb structure is formed by individual, profiled layers made of a thin, foil-like, metallic material, and in which the layers are bonded to each other and the honeycomb structure is bonded to the backing, wherein the bonding of the individual layers of the honeycomb structure and the bonding of the honeycomb structure with the backing are performed by a brazing process in which an aluminum alloy is used as brazing filler material, wherein the brazing filler material is applied by pack aluminizing.

24. A method in accordance with claim 3, wherein the brazing filler material is applied by physical vapor deposition (PVD).

25. A method in accordance with claim 3, wherein the brazing filler material is applied by chemical vapor deposition (CVD).

26. A method in accordance with claim 3, wherein the brazing filler material is applied to at least one surface of the material used for the honeycomb structure prior to processing.

27. A method in accordance with claim 3, wherein the brazing filler material is applied to at least one surface of the material used for the honeycomb structure in the form of an additional foil.

28. A method in accordance with claim 3, wherein the surface of the items to be joined is wetted with a surface-cleaning, low-melting flux prior to brazing.

29. A method in accordance with claim 28, wherein fluorides are used as the flux.

30. A method in accordance with claim 29, wherein potassium aluminum fluorides are used as the flux.

31. A method in accordance with claim 3, wherein the honeycomb structure, which is formed by the individual profiled layers, is made of material alloys of which the basis is one of iron, nickel, cobalt, titanium and combinations thereof.

* * * * *